(12) United States Patent  
Hong et al.

(10) Patent No.: US 9,190,094 B2  
(45) Date of Patent: Nov. 17, 2015

(54) PERPENDICULAR RECORDING MEDIA WITH GRAIN ISOLATION INITIATION LAYER AND EXCHANGE BREAKING LAYER FOR SIGNAL-TO-NOISE RATIO ENHANCEMENT

(71) Applicant: WD Media, LLC, San Jose, CA (US)

(72) Inventors: Daehoon Hong, Fremont, CA (US); Sy Vu, San Jose, CA (US); Kyongha Kang, Fremont, CA (US); B. Ramamurthy Acharya, Fremont, CA (US)

(73) Assignee: Western Digital (Fremont), Fremont, CA (US)

(*) Notice: Subject to any disclaimer, the term of this patent is extended or adjusted under 35 U.S.C. 154(b) by 121 days.

(21) Appl. No.: 13/911,944

(22) Filed: Jun. 6, 2013

(65) Prior Publication Data

US 2014/0300994 A1 Oct. 9, 2014

Related U.S. Application Data

(60) Provisional application No. 61/808,561, filed on Apr. 4, 2013.

(51) Int. Cl.
| | |
|---|---|
| *G11B 5/66* | (2006.01) |
| *G11B 5/84* | (2006.01) |
| *G11B 5/65* | (2006.01) |
| *G11B 5/73* | (2006.01) |

(52) U.S. Cl.
CPC .. *G11B 5/84* (2013.01); *G11B 5/65* (2013.01); *G11B 5/66* (2013.01); *G11B 5/7325* (2013.01); *Y10T 29/49021* (2015.01)

(58) Field of Classification Search
CPC ..... G11B 5/746; G11B 5/59688; G11B 5/855
USPC .................................................. 428/829–831
See application file for complete search history.

(56) References Cited

U.S. PATENT DOCUMENTS

| | | | |
|---|---|---|---|
| 6,013,161 | A | 1/2000 | Chen et al. |
| 6,063,248 | A | 5/2000 | Bourez et al. |
| 6,068,891 | A | 5/2000 | O'Dell et al. |
| 6,086,730 | A | 7/2000 | Liu et al. |
| 6,099,981 | A | 8/2000 | Nishimori |
| 6,103,404 | A | 8/2000 | Ross et al. |
| 6,117,499 | A | 9/2000 | Wong et al. |
| 6,136,403 | A | 10/2000 | Prabhakara et al. |

(Continued)

OTHER PUBLICATIONS

Sonobe et al., "Thermally Stable CGC Perpendicular Recording Media With PT-Rich CoPtCR and Thin PT Layers", IEEE Trans. Magn., vol. 38, 2002, pp. 2006-2011.

(Continued)

*Primary Examiner* — Holly Rickman

(57) ABSTRACT

Aspects of the present invention relate to a perpendicular magnetic recording (PMR) media stack and methods for fabricating the same. The PMR media stack has a novel grain isolation initiation layer (GIIL) and/or a novel exchange-break layer (EBL) that can improve the signal-to-noise performance of the PMR media stack. The PMR media stack includes a substrate, a soft underlayer on the substrate, an interlayer positioned on the soft underlayer, and a grain isolation initiation layer (GIIL) positioned on the interlayer, a magnetic layer positioned on the GIIL, and an exchange break layer (EBL) positioned on the magnetic layer. The GIIL and/or EBL includes a CoCrRu-oxide.

18 Claims, 8 Drawing Sheets

(56) References Cited

U.S. PATENT DOCUMENTS

| | | |
|---|---|---|
| 6,143,375 A | 11/2000 | Ross et al. |
| 6,145,849 A | 11/2000 | Bae et al. |
| 6,146,737 A | 11/2000 | Malhotra et al. |
| 6,149,696 A | 11/2000 | Jia |
| 6,150,015 A | 11/2000 | Bertero et al. |
| 6,156,404 A | 12/2000 | Ross et al. |
| 6,159,076 A | 12/2000 | Sun et al. |
| 6,164,118 A | 12/2000 | Suzuki et al. |
| 6,200,441 B1 | 3/2001 | Gornicki et al. |
| 6,204,995 B1 | 3/2001 | Hokkyo et al. |
| 6,206,765 B1 | 3/2001 | Sanders et al. |
| 6,210,819 B1 | 4/2001 | Lal et al. |
| 6,216,709 B1 | 4/2001 | Fung et al. |
| 6,221,119 B1 | 4/2001 | Homola |
| 6,248,395 B1 | 6/2001 | Homola et al. |
| 6,261,681 B1 | 7/2001 | Suekane et al. |
| 6,270,885 B1 | 8/2001 | Hokkyo et al. |
| 6,274,063 B1 | 8/2001 | Li et al. |
| 6,283,838 B1 | 9/2001 | Blake et al. |
| 6,287,429 B1 | 9/2001 | Moroishi et al. |
| 6,290,573 B1 | 9/2001 | Suzuki |
| 6,299,947 B1 | 10/2001 | Suzuki et al. |
| 6,303,217 B1 | 10/2001 | Malhotra et al. |
| 6,309,765 B1 | 10/2001 | Suekane et al. |
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,391,213 B1 | 5/2002 | Homola |
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,482,330 B1 | 11/2002 | Bajorek |
| 6,482,505 B1 | 11/2002 | Bertero et al. |
| 6,500,567 B1 | 12/2002 | Bertero et al. |
| 6,528,124 B1 | 3/2003 | Nguyen |
| 6,548,821 B1 | 4/2003 | Treves et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,628,466 B2 | 9/2003 | Alex |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,730,420 B1 | 5/2004 | Bertero et al. |
| 6,743,528 B2 | 6/2004 | Suekane et al. |
| 6,759,138 B2 | 7/2004 | Tomiyasu et al. |
| 6,778,353 B1 | 8/2004 | Harper |
| 6,795,274 B1 | 9/2004 | Hsieh et al. |
| 6,855,232 B2 | 2/2005 | Jairson et al. |
| 6,857,937 B2 | 2/2005 | Bajorek |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,939,120 B1 | 9/2005 | Harper |
| 6,946,191 B2 | 9/2005 | Morikawa et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,019,924 B2 | 3/2006 | McNeil et al. |
| 7,045,215 B2 | 5/2006 | Shimokawa |
| 7,070,870 B2 | 7/2006 | Bertero et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,147,790 B2 | 12/2006 | Wachenschwanz et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,229,266 B2 | 6/2007 | Harper |
| 7,239,970 B2 | 7/2007 | Treves et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,292,329 B2 | 11/2007 | Treves et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,320,584 B1 | 1/2008 | Harper et al. |
| 7,329,114 B2 | 2/2008 | Harper et al. |
| 7,375,362 B2 | 5/2008 | Treves et al. |
| 7,420,886 B2 | 9/2008 | Tomiyasu et al. |
| 7,425,719 B2 | 9/2008 | Treves et al. |
| 7,471,484 B2 | 12/2008 | Wachenschwanz et al. |
| 7,498,062 B2 | 3/2009 | Calcaterra et al. |
| 7,498,092 B2 | 3/2009 | Berger et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,550,210 B2 | 6/2009 | Berger et al. |
| 7,569,490 B2 | 8/2009 | Staud |
| 7,572,526 B2 | 8/2009 | Berger et al. |
| 7,582,368 B2 | 9/2009 | Berger et al. |
| 7,597,792 B2 | 10/2009 | Homola et al. |
| 7,597,973 B2 | 10/2009 | Ishiyama |
| 7,608,193 B2 | 10/2009 | Wachenschwanz et al. |
| 7,632,087 B2 | 12/2009 | Homola |
| 7,638,210 B2 | 12/2009 | Berger et al. |
| 7,656,615 B2 | 2/2010 | Wachenschwanz et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,687,157 B2 | 3/2010 | Berger et al. |
| 7,695,833 B2 | 4/2010 | Ishiyama |
| 7,722,968 B2 | 5/2010 | Ishiyama |
| 7,733,605 B2 | 6/2010 | Suzuki et al. |
| 7,736,768 B2 | 6/2010 | Ishiyama |
| 7,755,861 B1 | 7/2010 | Li et al. |
| 7,758,732 B1 | 7/2010 | Calcaterra et al. |
| 7,833,639 B2 | 11/2010 | Sonobe et al. |
| 7,833,641 B2 | 11/2010 | Tomiyasu et al. |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,955,723 B2 | 6/2011 | Umezawa et al. |
| 7,983,003 B2 | 7/2011 | Sonobe et al. |
| 7,989,096 B2 | 8/2011 | Berger et al. |
| 7,993,497 B2 | 8/2011 | Moroishi et al. |
| 7,993,765 B2 | 8/2011 | Kim et al. |
| 7,998,912 B2 | 8/2011 | Chen et al. |
| 8,000,060 B2 | 8/2011 | Zhang et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,076,013 B2 | 12/2011 | Sonobe et al. |
| 8,092,931 B2 | 1/2012 | Ishiyama et al. |
| 8,100,685 B1 | 1/2012 | Harper et al. |
| 8,101,054 B2 | 1/2012 | Chen et al. |

(56) References Cited

U.S. PATENT DOCUMENTS

| | | |
|---|---|---|
| 8,125,723 B1 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,163,093 B1 | 4/2012 | Chen et al. |
| 8,171,949 B1 | 5/2012 | Lund et al. |
| 8,173,282 B1 | 5/2012 | Sun et al. |
| 8,178,480 B2 | 5/2012 | Hamakubo et al. |
| 8,206,789 B2 | 6/2012 | Suzuki |
| 8,218,260 B2 | 7/2012 | Iamratanakul et al. |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,329,312 B1 | 12/2012 | Sanders et al. |
| 8,331,056 B2 | 12/2012 | O'Dell |
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 8,696,404 B2 | 4/2014 | Sun et al. |
| 8,711,499 B1 | 4/2014 | Desai et al. |
| 8,743,666 B1 | 6/2014 | Bertero et al. |
| 8,758,912 B2 | 6/2014 | Srinivasan et al. |
| 8,787,124 B1 | 7/2014 | Chernyshov et al. |
| 8,787,130 B1 | 7/2014 | Yuan et al. |
| 8,791,391 B2 | 7/2014 | Bourez |
| 8,795,765 B2 | 8/2014 | Koike et al. |
| 8,795,790 B2 | 8/2014 | Sonobe et al. |
| 8,795,857 B2 | 8/2014 | Ayama et al. |
| 8,800,322 B1 | 8/2014 | Chan et al. |
| 8,811,129 B1 | 8/2014 | Yuan et al. |
| 8,817,410 B1 | 8/2014 | Moser et al. |
| 2002/0060883 A1 | 5/2002 | Suzuki |
| 2003/0022024 A1 | 1/2003 | Wachenschwanz |
| 2004/0022387 A1 | 2/2004 | Weikle |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0263401 A1 | 12/2005 | Olsen et al. |
| 2006/0147758 A1 | 7/2006 | Jung et al. |
| 2006/0181697 A1 | 8/2006 | Treves et al. |
| 2006/0207890 A1 | 9/2006 | Staud |
| 2007/0070549 A1 | 3/2007 | Suzuki et al. |
| 2007/0245909 A1 | 10/2007 | Homola |
| 2007/0292720 A1 | 12/2007 | Suess |
| 2008/0075845 A1 | 3/2008 | Sonobe et al. |
| 2008/0093760 A1 | 4/2008 | Harper et al. |
| 2009/0117408 A1 | 5/2009 | Umezawa et al. |
| 2009/0136784 A1 | 5/2009 | Suzuki et al. |
| 2009/0169922 A1 | 7/2009 | Ishiyama |
| 2009/0191331 A1 | 7/2009 | Umezawa et al. |
| 2009/0195924 A1* | 8/2009 | Nemoto et al. ............... 360/110 |
| 2009/0202866 A1 | 8/2009 | Kim et al. |
| 2009/0311557 A1 | 12/2009 | Onoue et al. |
| 2010/0143752 A1 | 6/2010 | Ishibashi et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247963 A1* | 9/2010 | Kim et al. .................... 428/800 |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0003175 A1* | 1/2011 | Valcu et al. .................. 428/800 |
| 2011/0097603 A1 | 4/2011 | Onoue |
| 2011/0097604 A1 | 4/2011 | Onoue |
| 2011/0171495 A1 | 7/2011 | Tachibana et al. |
| 2011/0206947 A1 | 8/2011 | Tachibana et al. |
| 2011/0212346 A1* | 9/2011 | Onoue et al. .................. 428/828 |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |

(56) References Cited

U.S. PATENT DOCUMENTS

| | | |
|---|---|---|
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0225217 A1 | 9/2012 | Itoh et al. |
| 2012/0251842 A1 | 10/2012 | Yuan et al. |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |
| 2014/0151360 A1 | 6/2014 | Landdell et al. |
| 2014/0234666 A1 | 8/2014 | Knigge et al. |

OTHER PUBLICATIONS

Victora et al., "Composite media for perpendicular magnetic recording", IEEE Trans. Magn., vol. 41, 2005, pp. 537-542.

Suess et al., "Optimization of exchange spring perpendicular recording media", IEEE Trans. Magn. vol. 41, 2005, pp. 3166-3168.

Berger et al., "Improved media performance in optimally coupled exchange spring layer media", Applied Physics letters, vol. 93, 2008, pp. 122502-122502-3.

Zhang et al., "Effects of exchange coupling between cap layer and oxide layer on the recording performance in perpendicular media", Journal of Applied Physics, vol. 105, 2009, pp. 07B710-07B710-3.

Choe et al., "Control of Exchange Coupling Between Granular Oxide and Highly Exhange Coupled Cap Layers and the Effect on Perpendicular Magnetic Switching and Recording Characteristics", IEEE Trans. on Magnetics, vol. 45, No. 6, Jun. 2009, pp. 2694-2700.

Choe et al. "Writeability Enhancement in Perpendicular Magnetic Multilayered Oxide Media for High Areal Density Recording", IEEE Trans. on Magnetics, vol. 47, No. 1, Jan. 2011, pp. 55-62.

Nolan et al. "Effect of Composite Designs on Writability and Thermal Stability of Perpendicular Recording Media", IEEE Trans. on Magnetics, vol. 47, No. 1, Jan. 2011, pp. 63-68.

* cited by examiner

PERPENDICULAR RECORDING MEDIA WITH GRAIN ISOLATION INITIATION LAYER AND EXCHANGE BREAKING LAYER FOR SIGNAL-TO-NOISE RATIO ENHANCEMENT

CROSS-REFERENCE TO RELATED APPLICATION(S)

This application claims priority to and the benefit of U.S. Provisional Application No. 61/808,561 filed on Apr. 4, 2013, entitled "PERPENDICULAR RECORDING MEDIA WITH NEW GRAIN ISOLATION INITIATION LAYER AND/OR EXCHANGE BREAKING LAYER FOR SIGNAL TO NOISE RATIO ENHANCEMENT", the entire content of which is incorporated herein by reference.

FIELD

Aspects of the present invention relate to magnetic recording media, and more specifically to grain isolation initiation layer and exchange breaking layer of perpendicular magnetic recording (PMR) media.

BACKGROUND

Perpendicular magnetic recording (PMR) has been used to increase the areal recording density of magnetic storage media. A PMR media stack generally includes a substrate, an antiferromagnetic coupled soft magnetic underlayer (AFC-SUL), a seed layer, an intermediate layer, a grain isolation initiation layer (GIIL) and a magnetic layer stack, in that order. The magnetic layer stack includes a number of magnetic layers separated by a number of exchange-break layers (EBLs) or exchange-control layers (ECLs). The GIIL can enhance magnetic decoupling of the magnetic layers, and the EBLs help to reduce the coercivity (Hc) and saturation field (Hs) of the PMR media stack as a whole. Reduction of intergranular magnetic coupling of the magnetic layers is desirable because it can improve the signal-to-noise ratio (SNR) of the PMR media stack.

DETAILED DESCRIPTION

Figures 1, 2:
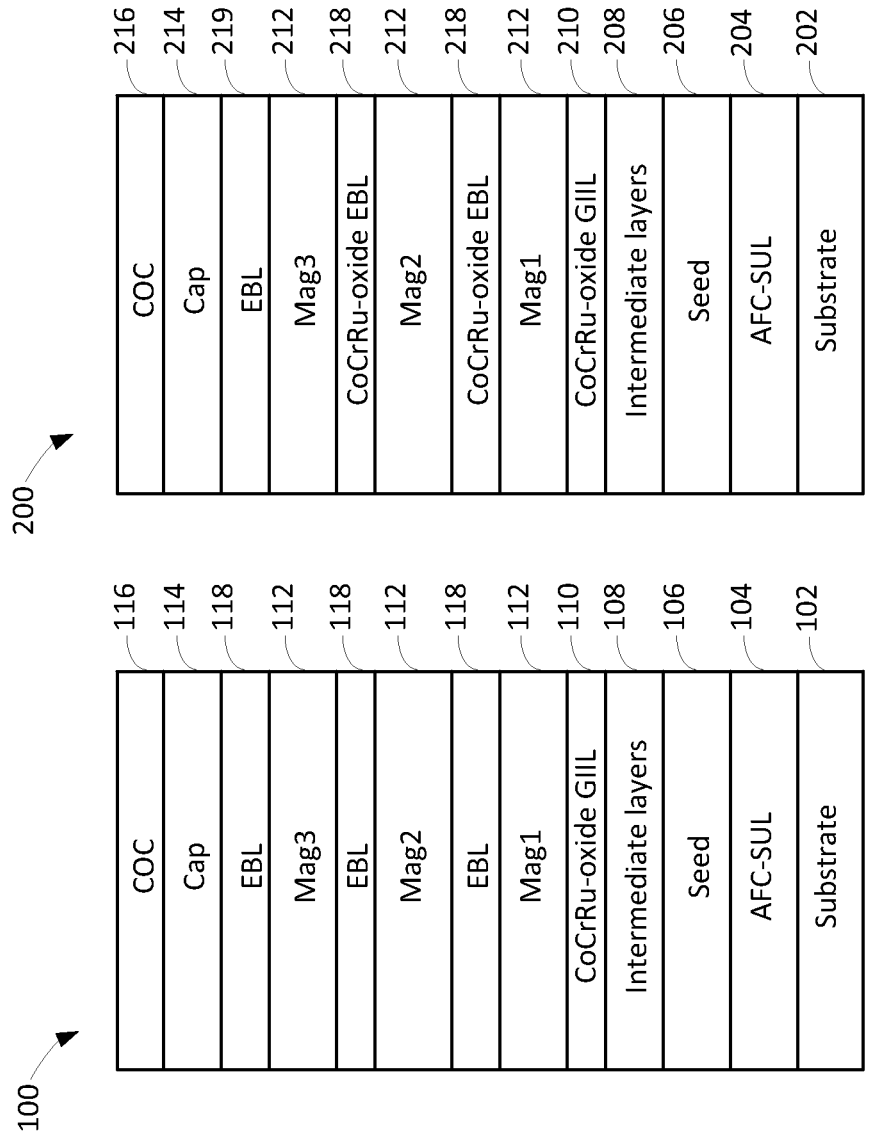
FIG. 1 is a drawing illustrating a perpendicular magnetic recording (PMR) media stack with a CoCrRu-oxide GIIL providing an improved signal-to-noise ratio (SNR) in accordance with an embodiment of the present invention.
FIG. 2 is a drawing illustrating a PMR media stack including a CoCrRu-oxide exchange break layer (EBL) with improved grain segregation, in accordance with an embodiment of the present invention.

Reduction of intergranular magnetic coupling of the magnetic layers is a key challenge to improving the signal-to-noise ratio (SNR) for perpendicular magnetic recording (PMR) media. In various aspects of the present invention, a PMR media stack of an exchange coupled composite media (ECC) with improved SNR and a method of making the same are provided.

A perpendicular magnetic recording (PMR) media stack of an ECC generally includes a number of soft magnetic underlayers (SUL), intermediate underlayers (IL), and a number of magnetic layers. To achieve higher areal density for PMR media, it is generally desirable to improve the SNR and writeability of the PMR media. For SNR improvement, it is desirable that the grains of magnetic layer have small grain size, narrow size distribution, and also are well decoupled magnetically. On the other hand, it is desirable that magnetic grain of the magnetic layer has suitably high magnetic anisotropy (Ku) to maintain thermal stability. The magnetic layer may include a CoPtX-oxide alloy (e.g., where X is Cr, Ru, or B, and the oxide is $TiO_2$, $SiO_2$, $Cr_2O_3$, $B_2O_3$, etc.). Using a CoPtX-oxide alloy, high Ku can be achieved by reducing non-magnetic elements such as Cr, Ru, or oxide; but in doing so magnetic coupling of magnetic grains also increases, which causes undesirable SNR. One solution to improve SNR of PMR media is to use a non-magnetic CoCr-oxide grain isolation initiation layer (GIIL) to overcome or reduce the magnetic coupling of high Ku magnetic layers. The CoCr-oxide GIIL is generally positioned below a magnetic layer of a PMR media stack and provides well-segregated grains with thick oxide grain boundaries. Therefore, PMR media may include the CoCr-oxide GIIL to control and improve segregation of magnetic grains because high Ku materials generally have strong intergranular coupling between magnetic grains.

In various aspects of the present disclosure, a CoCrRu-oxide GIIL may be used to replace the CoCr-oxide GIIL in the PMR media stack. The CoCrRu-oxide GIIL may effectively improve grain segregation of a magnetic layer, increase coercivity (Hc), and also substantially reduce noise of the magnetic media including the CoCrRu-oxide GIIL. In other aspects, the CoCrRu-oxide can also be used in an exchange break layer (EBL) because the CoCrRu-oxide has desirable exchange breaking property as well as segregation enhancement property.

In various aspects of the present disclosure, a novel GIIL may include a CoCrRu-oxide alloy (e.g., where the oxide is TiO2 at about 10 to 25 atomic percent and the Ru is at about 10 to 40 atomic percent). The presence of Ru in the GIIL can cause the Co to be substantially non-magnetic, and therefore Co may be used as a nonmagnetic intermediate layer if the amount of element (Ru) is more than magnetic transition composition. In one embodiment, the element Ru is completely solid soluble in a Co matrix, and is a strong hexagonal-closed-packed (HCP) phase stabilizer. In the CoCr-oxide GIIL, however, Cr easily can make second phase beyond a certain point because Cr is a body-centered-cubic (BCC) phase stabilizer.

FIG. 1 is a drawing illustrating a PMR media stack 100 with a CoCrRu-oxide GIIL providing an improved signal-to-noise ratio (SNR) in accordance with an aspect of the present disclosure. The segregation enhancement provided by the CoCrRu-oxide GIIL translates to higher coercivity (Hc) and improved on-track weighted sum SNR (wsSNR_init) and adjacent-track wsSNR (wsSNR_final) performance of the PMR media stack 100. The PMR media stack 100 includes a substrate 102 (e.g., Al—Mg or glass), an antiferromagnetic coupled soft magnetic underlayer (AFC-SUL) 104, a seed layer 106 (e.g., a NiWAlFe seed layer), dual Ru intermediate layers (ILs) 108, a CoCrRu-oxide GIIL 110 (e.g., the oxide is TiO2 at about 10 to 25 atomic percent, and the Ru is about 10 to 40 atomic percent), a number of magnetic layers 112 (e.g., Mag1, Mag2, and Mag3), a capping layer (114), and a carbon overcoat (COC) 116. The magnetic layers 112 are separated by a number of EBLs (118). In various embodiments, the magnetic layers may include a CoPtX-oxide alloy, wherein X is selected from the group consisting of Cr, Ru, and B, and the oxide is selected from the group consisting of TiO2, SiO2, Cr2O3, and B2O3. A number of exemplary materials are presented herein. However, in other embodiments, other suitable materials may also be used, including, for example, materials known in the art.

In one embodiment, a PMR media stack may be an exchange coupled composite medium. In one embodiment, a magnetic layer may include a number of magnetic layers (e.g., magnetic layers 112), and an EBL may include a number of EBLs (e.g., EBLs 118). The magnetic layers and the EBLs may be alternately arranged. In one embodiment, the EBL may include a CoCrRu-oxide. In one embodiment, the GIIL may include a material selected from the group consisting of a CoCrRu-oxide and a CoCr-oxide. In one embodiment, the EBL may include a number of EBLs, and two of the EBLs may include different materials. In one embodiment, the EBL may include TiO2 at about 10 to 25 atomic percent and Ru at about 10 to 40 atomic percent.

In the PMR media stack 100, Co has a hexagonal close packed (HCP) structure while Ru also has a HCP structure with bigger atom diameter. The Ru doping in the GIIL can form Co—Cr—Ru substitution solid solution with larger lattice constants. Therefore, the CoCrRu-oxide GIIL may play a role as a buffer layer to minimize or reduce stress induced by lattice constant mismatch because the atomic size of Ru is bigger than that of Co and Cr, which is closer to that of the Ru IL. Therefore, the lattice mismatch may be controlled and reduced by the amount of Ru in the CoCrRu-oxide GIIL.

In FIG. 1, the magnetic layers 112 (e.g., Mag1, Mag2, and Mag3) are separated by a number of EBLs 118. The EBLs 118 help to improve the write-ability of the PMR media stack 100 during the recording process by reducing coercivity (Hc) and saturation field (Hs) of the media stack substantially. The EBL 118 may include a Co—Ru or Co—Cr-oxide alloy. There is a Ku gradient from the Mag1 magnetic layer toward the Mag3 magnetic layer, and the Mag1 magnetic layer has the highest Ku. Because the magnetic layers 112 Mag1 to Mag3 have high Ku and are magnetically coupled, segregation still is important. The EBL 118 may include a CoCr-oxide alloy that serves as a segregation helper as well as an EBL.

FIG. 2 is a drawing illustrating a PMR media stack 200 including an EBL containing a CoCrRu-oxide to improve grain segregation, in accordance with an aspect of the disclosure. The PMR media stack 200 includes, starting from a base or bottom layer, a substrate 202 (e.g., Al—Mg or glass), an antiferromagnetic coupled soft magnetic underlayer (AFC-SUL) 204, a seed layer 206 (e.g., a NiWAlFe seed layer), dual Ru intermediate layers (ILs) 208, a CoCrRu-oxide GIIL 210 (e.g., the oxide is TiO2 at about 10 to 25 atomic percent and the Ru is about 10 to 40 atomic percent), a number of magnetic layers 212 (e.g., Mag1, Mag2, and Mag3), a capping layer (214), and a carbon overcoat (COC) 216. The magnetic layers 212 are separated by a number of EBLs 218 and 219. The EBLs 218 include a CoCrRu-oxide, and the EBL 219 may be a different material than that of the EBLs 218. For example, the EBL 219 may include CoRu or other suitable materials known in the art. A number of exemplary materials are presented herein. However, in other embodiments, other suitable materials may also be used, including, for example, materials known in the art.

Figure 3:
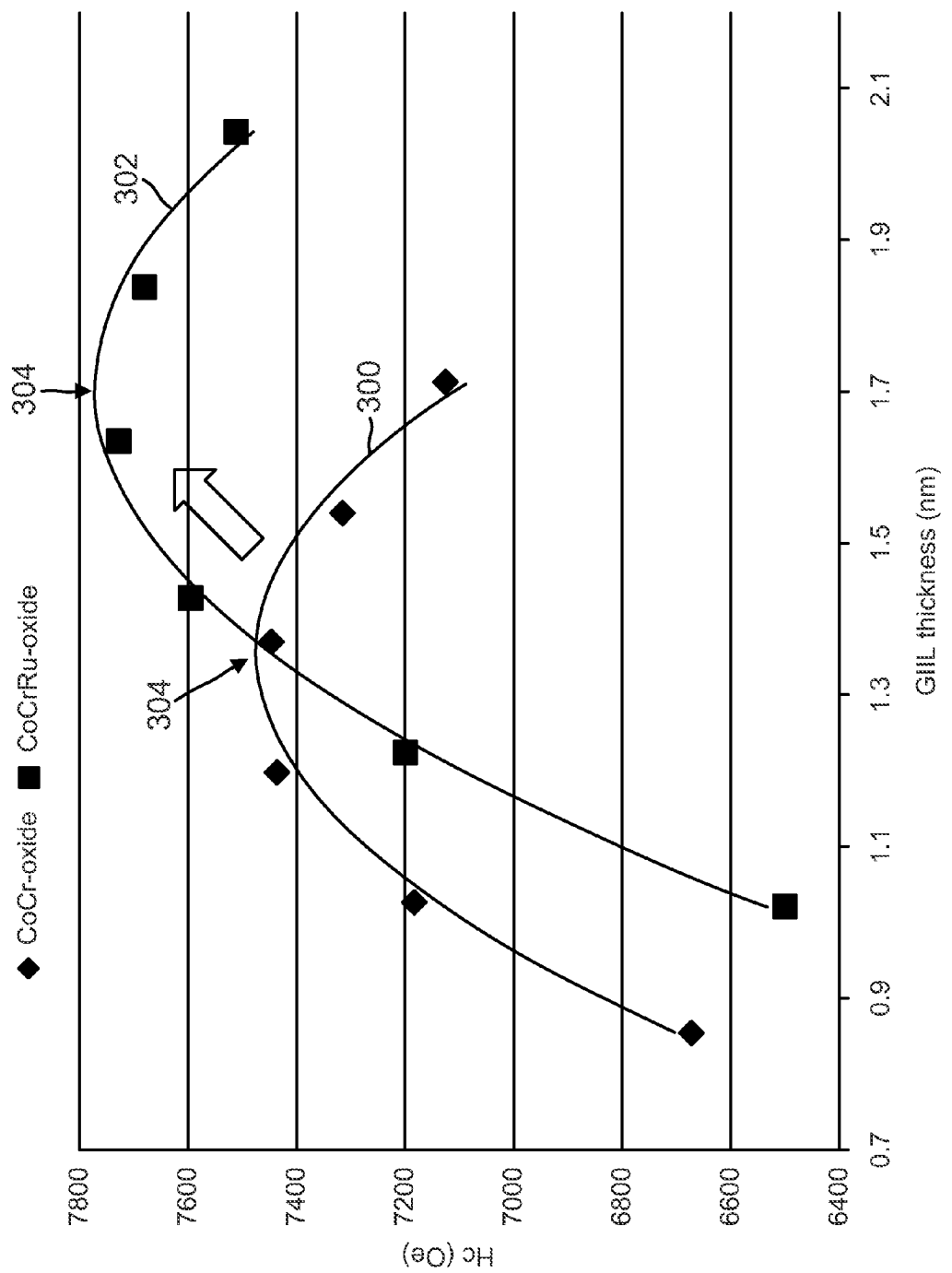
FIG. 3 is a plot illustrating a comparison of a PMR media stack including a CoCrRu-oxide GIIL with a PMR media stack including a CoCr-oxide GIIL in terms of coercivity as a function of GIIL thickness in accordance with an embodiment of the present invention.

FIG. 3 is a plot illustrating a comparison of a PMR media stack including a CoCrRu-oxide GIIL (e.g., GIIL 110) with a PMR media stack including a CoCr-oxide GIIL in terms of coercivity (Hc) as a function of GIIL thickness (nm). For this comparison, both media stacks include a single magnetic layer (e.g., Mag1 in FIG. 1) of 7 nm and the same IL to compare segregation effect. In FIG. 3, the horizontal axis corresponds to the GIIL thickness (nm), and the vertical axis corresponds to the coercivity (Oe). The curve 300 of the CoCr-oxide GIIL and the curve 302 of the CoCrRu-oxide GIIL both show similar Hc trends. For each GIIL, its Hc initially increases with thickness until it reaches a maximum Hc 304. This initial Hc increase is due to improved segregation with the help of the GIIL. Beyond the thickness for the maximum Hc 304, Hc starts to decrease for both GIILs. The Hc drop can be explained that the segregation effect saturates at the maximum Hc, and subgrains begin to form in the magnetic layer. The difference in Hc between the CoCr-oxide GIIL and the CoCrRu-oxide GIIL is shown in FIG. 3. The maximum Hc is about 300 to 400 Oe higher for the CoCrRu-oxide GIIL than that of the CoCr-oxide GIIL because CoCrRu may provide better segregation effect to the magnetic layers grown above.

Figure 4:
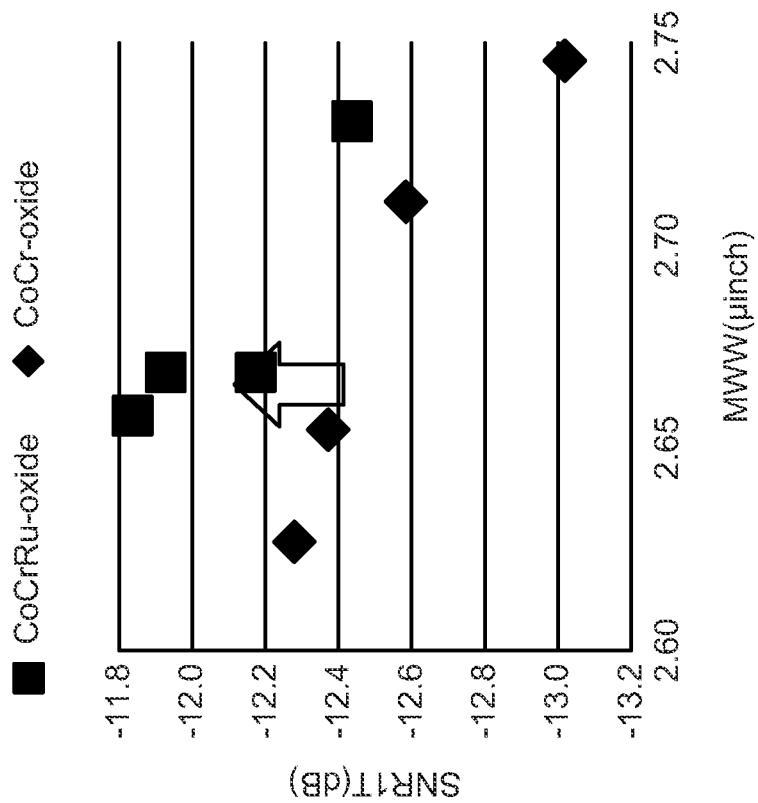
FIG. 4 is a plot illustrating a comparison of SNR-2T versus magnetic write width (MWW) of PMR media stacks respectively including a CoCr-oxide GIIL and a CoCrRu-oxide GIIL in accordance with an embodiment of the present invention.
Figure 5:
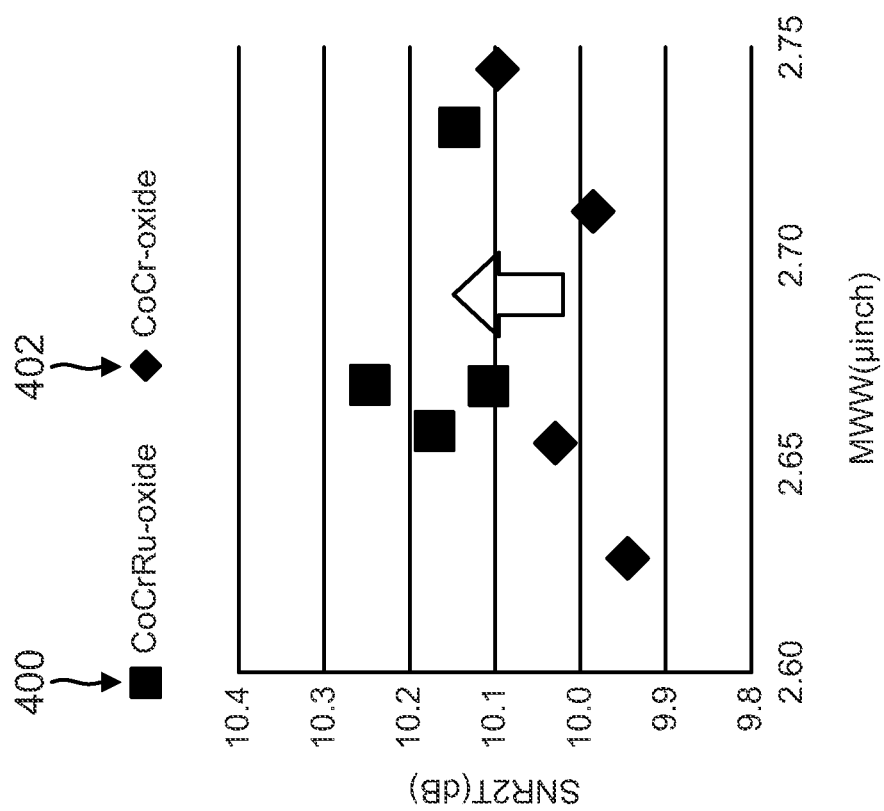
FIG. 5 is a plot illustrating a comparison of SNR-1T versus MWW of PMR media stacks respectively including a CoCr-oxide GIIL and a CoCrRu-oxide GIIL in accordance with an embodiment of the present invention.

FIG. 4 is a plot illustrating a comparison of SNR-2T versus magnetic write width (MWW) of PMR media stacks respectively including a CoCr-oxide GIIL and a CoCrRu-oxide GIIL (e.g., GIIL 110 or 210). FIG. 5 is a plot illustrating a comparison of SNR-1T versus MWW of PMR media stacks respectively including a CoCr-oxide GIIL and a CoCrRu-oxide GIIL (e.g., GIIL 110 or 210). Improved grain segregation of magnetic layers may be shown by examining high frequency SNR because better grain segregation improves high frequency SNRs at 2T and 1T frequencies, where 1T is the period for the highest frequency of the magnetic media stacks.

In FIG. 4, the horizontal axis corresponds to MWW in micro-inch, and the vertical axis corresponds to SNR-T2. In FIG. 5, the horizontal axis corresponds to MWW in micro-inch, and the vertical axis corresponds to SNR-T1. In both FIGS. 4 and 5, the data corresponding to the CoCrRu-oxide GIIL is denoted by the square symbol 400, and the data corresponding to the CoCr-oxide oxide GIIL is denoted by the diamond symbol 402. As shown in FIGS. 4 and 5, the media stack with the CoCrRu-oxide GIIL layer improves its SNR-2T by about 0.2 dB and SNR-1T by about 0.4 dB for a given MWW (e.g., between about 2.65 and 2.70 micro-inch).

Figure 6:
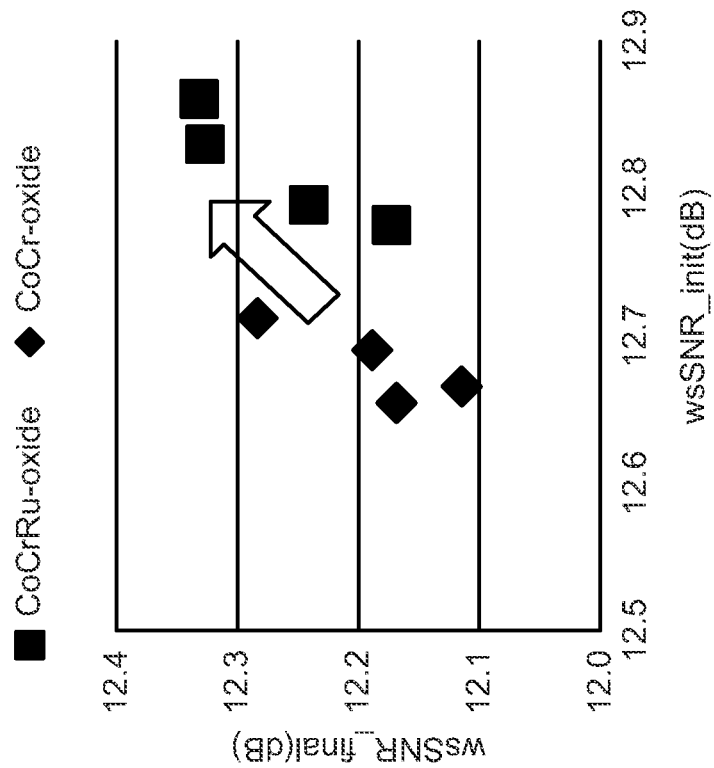
FIG. 6 is a plot illustrating a comparison of reverse overwrite (OW2) versus MWW between a PMR media stack with a CoCr-oxide GIIL and a PMR media stack with a CoCrRu-oxide GIIL in accordance with an embodiment of the present invention.

FIG. 6 is a plot illustrating a comparison of reverse overwrite (OW2) versus magnetic write width (MWW) between a PMR media stack with a CoCr-oxide GIIL and a PMR media stack with a CoCrRu-oxide GIIL (e.g., GIIL 110 or 210). In FIG. 6, the horizontal axis corresponds to the MWW (micro-inch), and the vertical axis corresponds to OW2 (dB). The data corresponding to the CoCr-oxide GIIL is denoted by the square symbol 500, and the data corresponding to the CoCrRu-oxide GIIL is denoted by the diamond symbol 502. Generally, a more magnetically decoupled PMR media stack has poor OW2 relatively. FIG. 6, however, shows that the PMR media stack with the CoCrRu-oxide GIIL has comparable OW2 to that of the PMR media stack with the CoCr-oxide GIIL.

Figure 7:
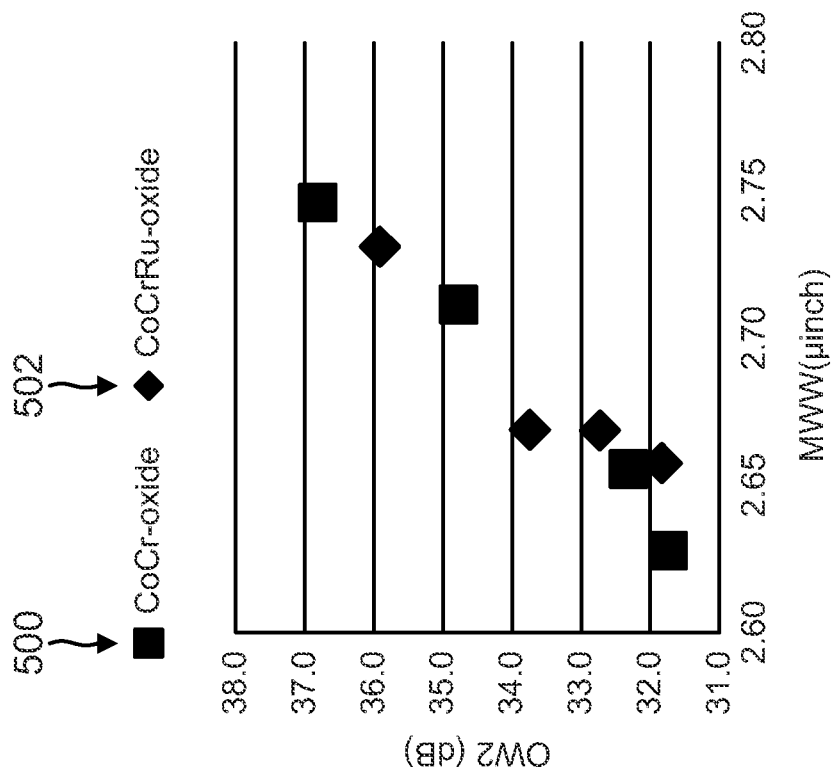
FIG. 7 is a plot illustrating a comparison of on-track weighted sum SNR (wsSNR_init) versus adjacent-track wsSNR (wsSNR_final) between a PMR media stack with a CoCr-oxide GIIL and a PMR media stack with a CoCrRu-oxide GIIL in accordance with an embodiment of the present invention.

FIG. 7 is a plot illustrating a comparison of on-track weighted sum SNR (wsSNR_init) versus adjacent-track wsSNR (wsSNR_final) between a PMR media stack with a CoCr-oxide GIIL and a PMR media stack with a CoCrRu-oxide GIIL (e.g., GIIL 110 or 210). In FIG. 7, the horizontal axis corresponds to wsSNR_init (dB), and the vertical axis corresponds to wsSNR_final (dB). As shown in FIG. 7, the PMR media stack with the CoCrRu-oxide GIIL shows improvement on wsSNR_init as well as wsSNR_final by about 0.2 dB.

Figures 8, 9:
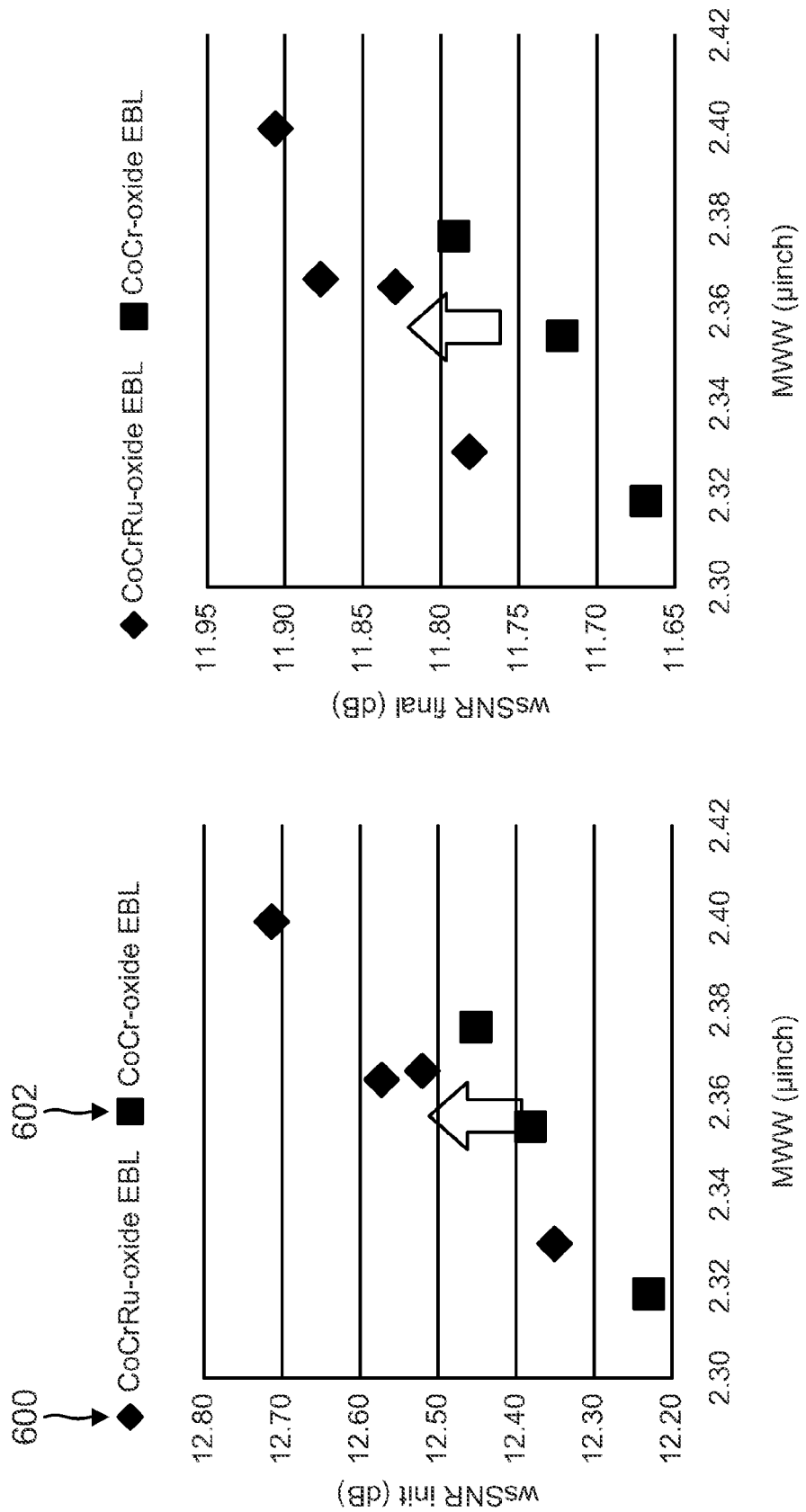
FIG. 8 is a plot illustrating a comparison of wsSNR_init versus MWW between a PMR media stack with a CoCr-oxide EBL and a PMR media stack with a CoCrRu-oxide EBL in accordance with an embodiment of the present invention.
FIG. 9 is a plot illustrating a comparison of wsSNR_final versus MWW of a media stack with a CoCr-oxide EBL and a PMR media stack with a CoCrRu-oxide EBL in accordance with an embodiment of the present invention.

FIG. 8 is a plot illustrating a comparison of wsSNR_init versus MWW between a PMR media stack with a CoCr-oxide EBL and a PMR media stack with a CoCrRu-oxide EBL (e.g., EBL 218). FIG. 9 is a plot illustrating a comparison of wsSNR_final versus MWW of a media stack with a CoCr-oxide EBL and a PMR media stack with a CoCrRu-oxide EBL (e.g., EBL 218). In both FIGS. 8 and 9, the data corresponding to the CoCrRu-oxide EBL is denoted by the diamond symbol 600, and the data corresponding to the CoCr-oxide EBL is denoted by the square symbol 602. In both FIGS. 8 and 9, the horizontal axis corresponds to the MWW (micro-inch). In FIG. 8, the vertical axis corresponds to wsSNR_init (dB). In FIG. 9, the vertical axis corresponds to wsSNR_final (dB). The media stack with a CoCrRu-oxide EBL shows both wsSNR_init and wsSNR_final improvement by about 0.1 dB as compared to the CoCr-oxide EBL.

Figures 10, 11:
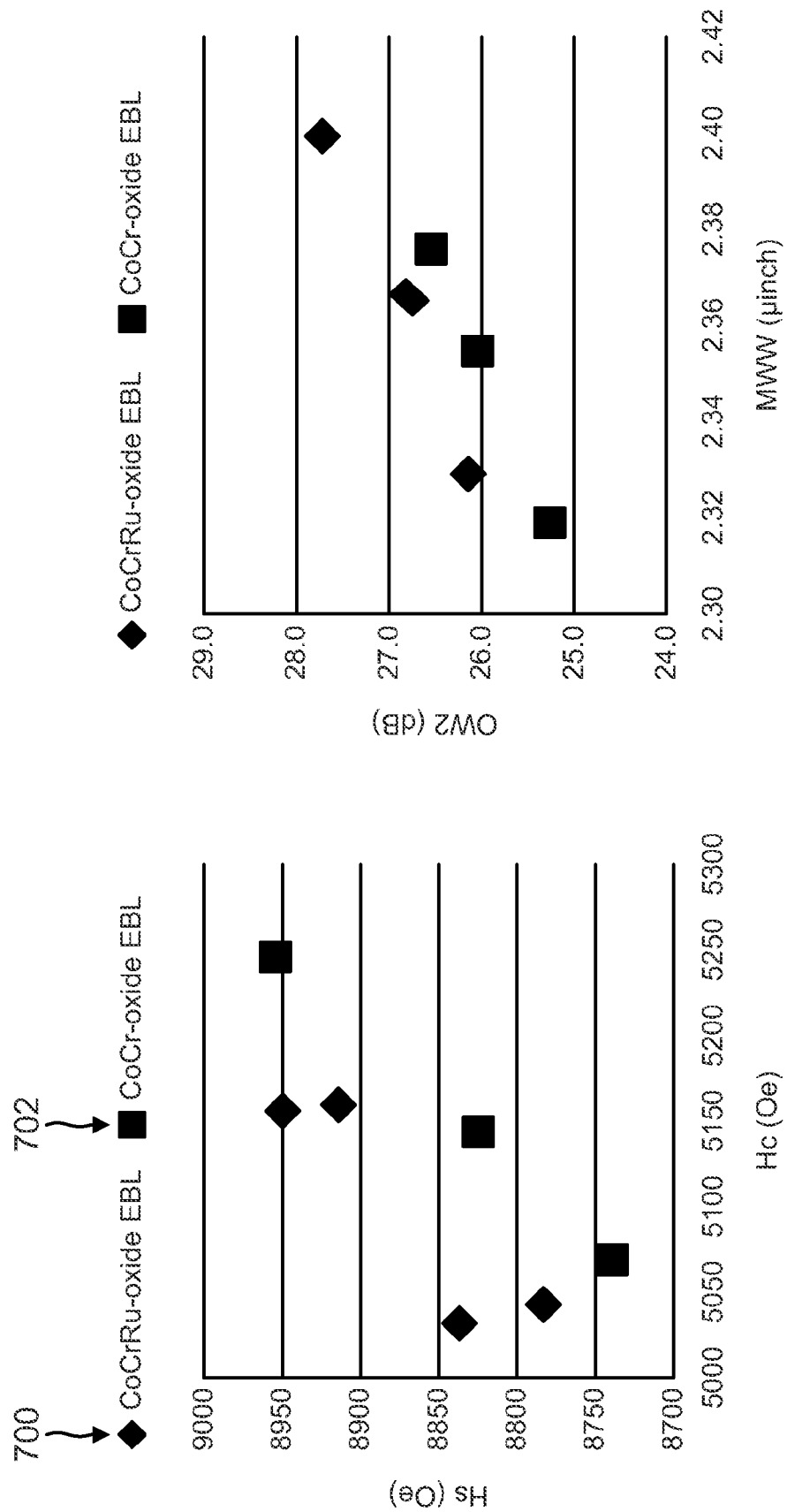
FIG. 10 is a plot illustrating a comparison of saturation field versus coercivity between a PMR media stack with a CoCr-oxide EBL and a PMR media stack with a CoCrRu-oxide EBL in accordance with an embodiment of the present invention.
FIG. 11 is a plot illustrating a comparison of OW2 versus MWW of a PMR media stack with a CoCr-oxide EBL and a PMR media stack with a CoCrRu-oxide EBL in accordance with an embodiment of the present invention.

FIG. 10 is a plot illustrating a comparison of Hs versus Hc between a PMR media stack with a CoCr-oxide EBL and a PMR media stack with a CoCrRu-oxide EBL (e.g., EBL 218). FIG. 11 is a plot illustrating a comparison of OW2 versus MWW of a PMR media stack with a CoCr-oxide EBL and a PMR media stack with a CoCrRu-oxide EBL (e.g., EBL 218). In both FIGS. 10 and 11, the data corresponding to the CoCrRu-oxide EBL is denoted by the diamond symbol 700, and the data corresponding to the CoCr-oxide EBL is denoted by the squire symbol 702. In FIG. 10, the horizontal axis corresponds to Hc (Oe), and the vertical axis corresponds to Hs (Oe). In FIG. 11, the horizontal axis corresponds to MWW (micro-inch), and the vertical axis corresponds to OW2 (dB). As shown in FIG. 10, Hs is higher for the PMR media stack with a CoCrRu-oxide EBL for a given Hc because this media is more decoupled magnetically. Due to increased Hs, as shown in FIG. 11, OW2 is affected (increased) by about 0.5 dB for the PMR media stack with a CoCrRu-oxide EBL.

Figure 12:
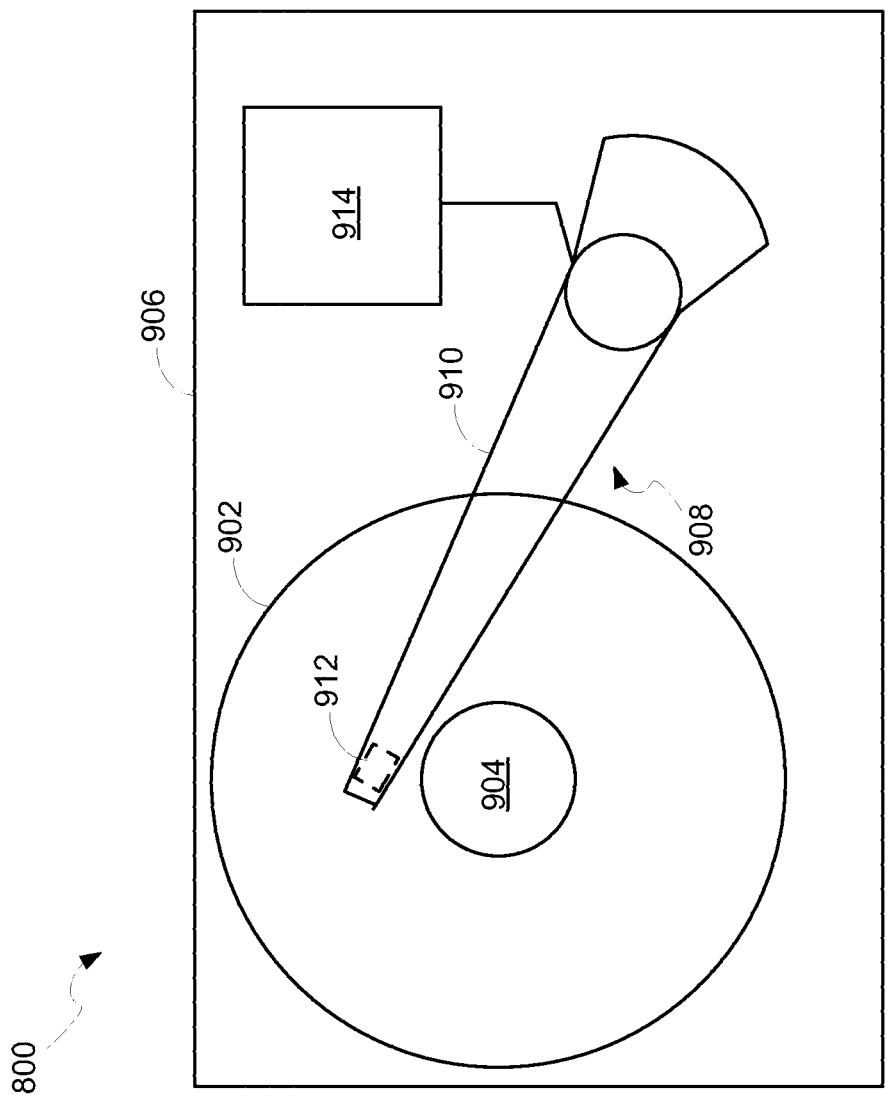
FIG. 12 is a conceptual drawing illustrating a hard disk drive including a PMR media stack in accordance with an embodiment of the present invention.

FIG. 12 is a conceptual drawing illustrating a hard disk drive 800 including a PMR media stack in accordance with an embodiment of the present invention. The disk drive 900 may include a disk 902 to store data. The disk 902 may include a PMR media stack similar to the PMR media stack 200 or 300. The disk 902 resides on a spindle assembly 904 that is mounted to a drive housing 906. Data may be stored along tracks in a magnetic recording layer of the disk 902. The disk drive 900 also includes a spindle motor (not shown) that rotates a spindle assembly 904 and, thereby, the disk 902 to position a read/write head 912 at a particular location along a desired disk track. The position of the read/write head 912 relative to the disk 902 may be controlled by a position control circuitry 914. Components of the disk drive 900 that are generally known in the art and not necessary for understanding the present invention, are omitted for clarity.

Figure 13:
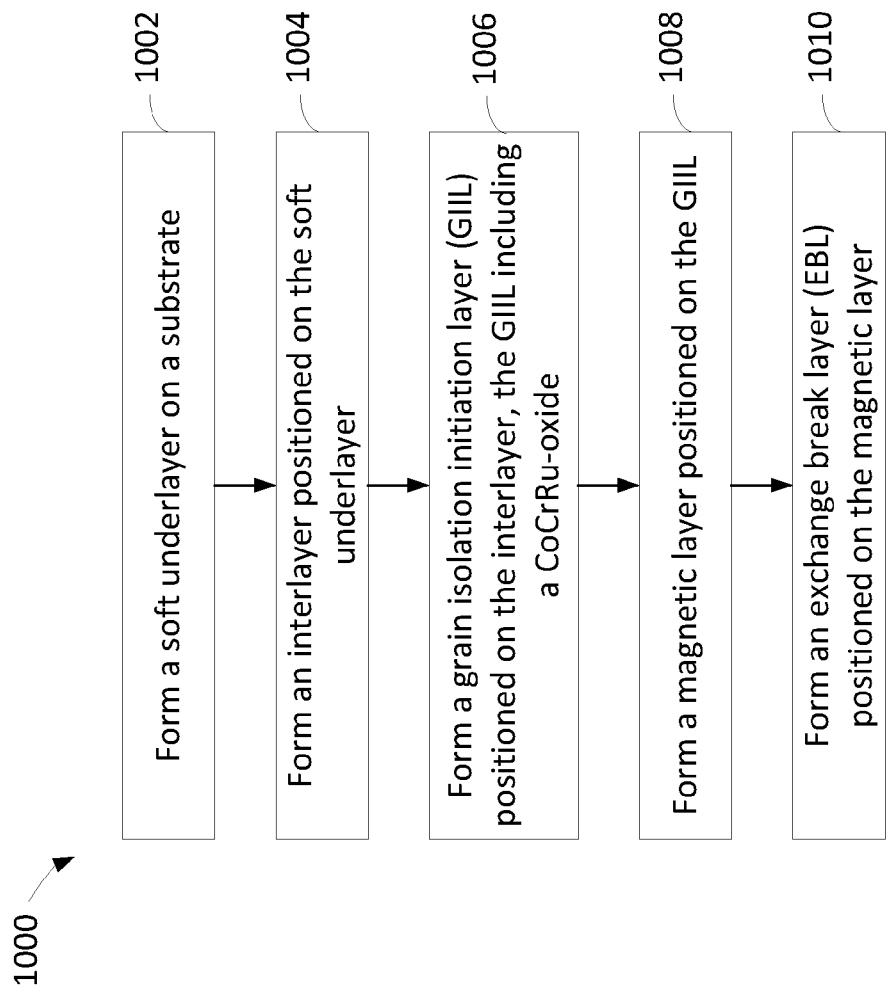
FIG. 13 is a flow chart illustrating a method of fabricating a perpendicular magnetic recording media stack with a CoCrRu-oxide GIIL in accordance with an embodiment of the present invention.

FIG. 13 is a flow chart illustrating a method 1000 of fabricating a perpendicular magnetic recording media stack in accordance with an embodiment of the present invention. In step 1002, a soft underlayer (e.g., underlayer 104 or 204) is formed on a substrate (e.g., substrate 102 or 202). In step 1004, an interlayer (e.g., interlayer 108 or 208) is formed and positioned on the soft underlayer. In step 1006, a grain isolation initiation layer (e.g., GIIL 110 or 210) is formed and positioned on the interlayer. In one aspect, the GIIL includes a CoCrRu-oxide. In step 1008, a magnetic layer (e.g., Mag1 112 or 212) is formed and positioned on the GIIL. In step 1008, an exchange break layer (e.g., EBL 118 or 218) is formed and positioned on the magnetic layer.

In several embodiments, the deposition of layers can be performed using a variety of deposition sub-processes, including, but not limited to physical vapor deposition (PVD), sputter deposition and ion beam deposition, and chemical vapor deposition (CVD) including plasma enhanced chemical vapor deposition (PECVD), low pressure chemical vapor deposition (LPCVD) and atomic layer chemical vapor deposition (ALCVD). In other embodiments, other suitable deposition techniques known in the art may also be used.

It shall be appreciated by those skilled in the art in view of the present disclosure that although various exemplary fabrication methods are discussed herein with reference to magnetic recording media, disks or wafers containing magnetic heads, the methods, with or without some modifications, may be used for fabricating other types of recording disks, for example, optical recording disks such as a compact disc (CD) and a digital-versatile-disk (DVD), or magneto-optical recording disks, or ferroelectric data storage devices.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A perpendicular magnetic recording (PMR) media stack comprising:
   a substrate;
   a soft underlayer on the substrate;
   an interlayer positioned on the soft underlayer;
   a non-magnetic grain isolation initiation layer (GIIL) positioned on the interlayer, the GIIL comprising a CoCrRu-oxide;
   a magnetic layer positioned on the GIIL; and
   an exchange break layer (EBL) positioned on the magnetic layer,
   wherein the magnetic layer comprises a plurality of magnetic layers, and the EBL comprises a plurality of EBLs, the magnetic layers and the EBLs being alternately arranged, and
   wherein each of the plurality of EBLs is configured to prevent a magnetic exchange coupling between a first layer above and a second layer below the each of the plurality of EBLs.

2. The PMR media stack of claim 1, wherein the GIIL comprises $TiO_2$ at about 10 to 25 atomic percent and Ru at about 10 to 40 atomic percent.

3. The PMR media stack of claim 1, wherein the magnetic layer comprises a CoPtX-oxide alloy, wherein X is selected from the group consisting of Cr, Ru, and B, and the oxide is selected from the group consisting of $TiO_2$, $SiO_2$, $Cr_2O_3$, and $B_2O_3$.

4. The PMR media stack of claim 1, wherein the interlayer comprises Ru.

5. The PMR media stack of claim 1, wherein the substrate comprises a material selected from the group consisting of Al—Mg and glass.

6. The PMR media stack of claim 1, wherein the soft underlayer comprises an antiferromagnetic coupled soft magnetic underlayer.

7. A perpendicular magnetic recording (PMR) media stack comprising:
   a substrate;
   a soft underlayer on the substrate;
   an interlayer positioned on the soft underlayer;
   a non-magnetic grain isolation initiation layer (GIIL) positioned on the interlayer, the GIIL comprising a CoCrRu-oxide;
   a magnetic layer positioned on the GIIL; and
   an exchange break layer (EBL) positioned on the magnetic layer,
   wherein the magnetic layer comprises a plurality of magnetic layers, and the EBL comprises a plurality of EBLs, the magnetic layers and the EBLs being alternately arranged,
   wherein a first EBL and a second EBL of the plurality of EBLs, comprise different materials, and
   wherein the first EBL comprises a CoCrRu-oxide, and the second EBL comprises a CoCr-oxide.

8. The PMR media stack of claim 7, wherein the first EBL comprises $TiO_2$ at about 10 to 25 atomic percent and Ru at about 10 to 40 atomic percent.

9. A hard disk drive comprising the PMR media stack of claim 1.

10. A method of fabricating a perpendicular magnetic recording (PMR) media stack, the method comprising:
    forming a soft underlayer on a substrate;
    forming an interlayer positioned on the soft underlayer;
    forming a non-magnetic grain isolation initiation layer (GIIL) positioned on the interlayer, the GIIL comprising a CoCrRu-oxide;
    forming a magnetic layer positioned on the GIIL; and
    forming an exchange break layer (EBL) positioned on the magnetic layer,
    wherein the magnetic layer comprises a plurality of magnetic layers, and the EBL comprises a plurality of EBLs, the magnetic layers and the EBLs being alternately arranged, and
    wherein each of the plurality of EBLs is configured to prevent a magnetic exchange coupling between a first layer above and a second layer below the each of the plurality of EBLs.

11. The method of claim 10, wherein the GIIL comprises $TiO_2$ at about 10 to 25 atomic percent and Ru at about 10 to 40 atomic percent.

12. The method of claim 10, wherein the magnetic layer comprises a CoPtX-oxide alloy, wherein X is selected from the group consisting of Cr, Ru, and B, and the oxide is selected from the group consisting of $TiO_2$, $SiO_2$, $Cr_2O_3$, and $B_2O_3$.

13. The method of claim 10, wherein the interlayer comprises Ru.

14. The method of claim 10, wherein the substrate comprises a material selected from the group consisting of Al—Mg and glass.

15. The method of claim 10, wherein the soft underlayer comprises an antiferromagnetic coupled soft magnetic underlayer.

16. A method of fabricating a perpendicular magnetic recording (PMR) media stack, the method comprising:
    forming a soft underlayer on a substrate;
    forming an interlayer positioned on the soft underlayer;
    forming a non-magnetic grain isolation initiation layer (GIIL) positioned on the interlayer, the GIIL comprising a CoCrRu-oxide;
    forming a magnetic layer positioned on the GIIL; and
    forming an exchange break layer (EBL) positioned on the magnetic layer,
    wherein forming the magnetic layer comprises forming a plurality of magnetic layers; and
    wherein forming the first EBL comprises forming a plurality of EBLs, the magnetic layers and the EBLs being alternately arranged,
    wherein a first EBL and a second EBL of the plurality of EBLs, comprise different materials, and
    wherein the first EBL comprises a CoCrRu-oxide, and the second EBL comprises a CoCr-oxide.

17. The method of claim 16, wherein the first EBL comprises TiO2 at about 10 to 25 atomic percent and Ru at about 10 to 40 atomic percent.

18. The method of claim 10, wherein the GIIL comprising the CoCrRu-oxide comprises Ru at about 10 to 40 atomic percent.

\* \* \* \* \*